United States Patent [19]

Mueller

[11] Patent Number: 5,076,544

[45] Date of Patent: Dec. 31, 1991

[54] CONNECTING APPARATUS OF A HOIST DRUM

[75] Inventor: Robert W. Mueller, Brookfield, Wis.

[73] Assignee: Harnischfeger Corporation, Brookfield, Wis.

[21] Appl. No.: 538,613

[22] Filed: Jun. 15, 1990

[51] Int. Cl.$^{5}$ .......................... B66D 1/28; F16B 3/00

[52] U.S. Cl. .................................... 254/332; 254/266; 29/123; 29/244; 29/894.2; 403/356; 403/371; 403/378

[58] Field of Search ................. 29/244, 245, 247, 249, 29/894.2, 123; 254/269, 266, 344, 351, 356, 375, 901, 329, 332; 403/355, 356, 358, 370, 371, 378; 414/530, 564

[56] References Cited

U.S. PATENT DOCUMENTS

| | | | |
|---|---|---|---|
| 3,670,589 | 6/1972 | Carter | 254/344 X |
| 3,744,760 | 7/1973 | Uher | 254/351 |
| 3,786,935 | 1/1974 | Vlazny et asl. | 254/356 X |
| 4,004,780 | 1/1977 | Kuzarov | 254/356 X |
| 4,504,249 | 3/1985 | Fortier et al. | 403/358 X |

*Primary Examiner*—Joseph M. Gorski
*Assistant Examiner*—Peter Dungba Vo
*Attorney, Agent, or Firm*—Richard C. Ruppin

[57] ABSTRACT

An apparatus and method for connecting a rotatable hub to a drive shaft is disclosed in which the rotatable hub has an axial opening and a radial through opening between an outer surface of the hub and the axial opening of the hub. A rotatable shaft having an axial slot is positioned in the axial opening of the hub with the slot facing the radial through opening of the hub. One or more pins are inserted through the through opening in the hub into the slot in the shaft to insure rotation of the shaft and the hub together. The radial through opening may be covered at the outer surface of the hub to hold the pin in the through opening and in the slot.

9 Claims, 2 Drawing Sheets

CONNECTING APPARATUS OF A HOIST DRUM

FIELD OF THE INVENTION

The invention relates to the connecting of a rotatable shaft to a hub. More particularly the invention relates to a method and apparatus for connecting the shaft of a gear drive to the hub flange of a rotatable hoist.

BACKGROUND OF THE INVENTION

In mechanical drive systems in which the system is subjected to particularly heavy loads or where it is extremely important that the load be safely handled, it is critical that rotating members which are connected together have a highly secure and safe connection arrangement. A further requirement of such mechanical drive systems is that the connector means between the rotating members be readily installable and removable without the need for disassembly of other components of the system or mechanical stress on such components. An example of a mechanical drive system in which both of these requirements are desirable is a hoist system having a rotatable member such as a drum for lifting and lowering loads. The hoist may have a permanent stationary location or it may be movable, for example the hoist may be mounted on a crane for movement with the crane to various locations for lifting and carrying objects. Drive gear mechanisms such as reduction gearboxes which are specifically designed for the operation of a device such as a hoist include a highly secure connection to the hoist. However, such custom designed drive gear mechanisms are expensive and their installation with the hoist on a supporting framework is typically time consuming and costly. Further, if it is necessary to remove the hoist or drive gear for repair, it may be necessary to partially disassemble the drive gear mechanism to permit its removal or the removal of the hoist. This disassembly work is also time consuming and expensive. A solution to the high cost of a custom drive gear mechanism and its time consuming problems of installation and removal, is to use a standard drive gear mechanism with a standard connector for connecting the drive shaft of the drive gear to the driven apparatus. Standard connectors typically will permit a relatively easy connection and removal of the standard drive gear and the hoist for initial installation and removal of the hoist or drive gear for repair purposes. However, where the driven apparatus is of a type requiring a highly secure connection, such as in a hoist, standard connectors that are presently available and suitable for making the connection may not be entirely satisfactory.

SUMMARY OF THE INVENTION

It is a general object of this invention to provide a simple method for connecting a drive gear mechanism to a driven apparatus and a connector for making the connection which is highly reliable in preventing relative movement of the drive gear mechanism and the driven apparatus. It is a further object of the invention to provide a connector for connecting a drive gear to a hoist which has a backup pin for preventing rotation of the hoist relative to the drive gear.

The invention is carried out by providing a rotatable hub flange having an axial opening with a radial through opening between an outer surface of the hub flange and the axial opening of the hub flange. A rotatable shaft having an axial slot is positioned in the axial opening of the hub flange with the slot facing the radial through opening of the hub flange. A pin is inserted through the opening in the hub flange into the slot in the shaft to ensure rotation of the shaft and the hub flange together. The radial through opening may be covered at the outer surface of the hub flange to hold the pin in the through opening and in the slot.

The hub flange comprises part of the end of the drum of a hoist and the shaft may be part of a drive means for rotating the drum. The hoist may include rope means connected to and windable onto or off of the drum as the drum rotates, and load attachment means connected to the rope means for raising and lowering a load as the rope is wound onto and off of the drum. The hub flange includes a hollow cylindrical wall axially aligned with the axis of the drum and forming the axial opening in the hub flange. The shaft extends into the cylindrical wall with the slot disposed axially relative to the axis of the shaft. Connector means is positioned on the hub flange for holding the shaft and hub flange together so that the drive means can rotate the drum. The connector means includes at least one radial opening through the cylindrical wall and a pin extending through the opening and into the slot in the shaft so that the hub flange and shaft are prevented from rotating relative to each other during rotation of the drum and drive means.

The connector means may include ring means in surrounding engagement with the hub flange for holding the pin in the opening in the hub flange and in the slot in the drive shaft. The ring means may also function to apply radial force to the hub flange in the direction of the drive shaft to hold the hub flange and shaft together.

BRIEF DESCRIPTION OF THE DRAWINGS

Further objects and advantages of the invention will appear when taken in conjunction with the accompanying drawings, in which.

DESCRIPTION OF THE PREFERRED EMBODIMENT

Figure 1:
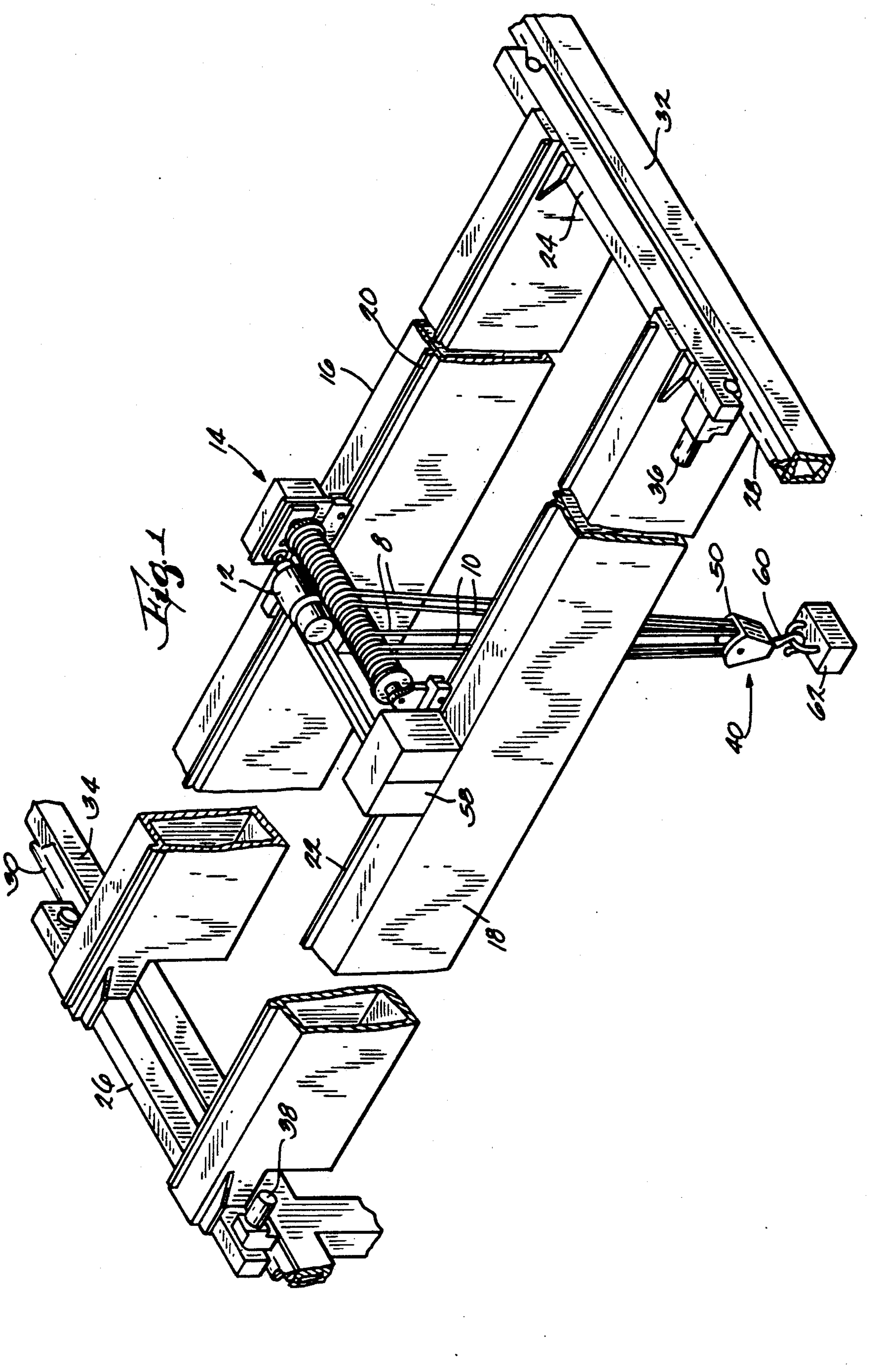
FIG. 1 is a perspective view of an overhead crane and trolley having a hoist and incorporating the present invention.
Figure 2:
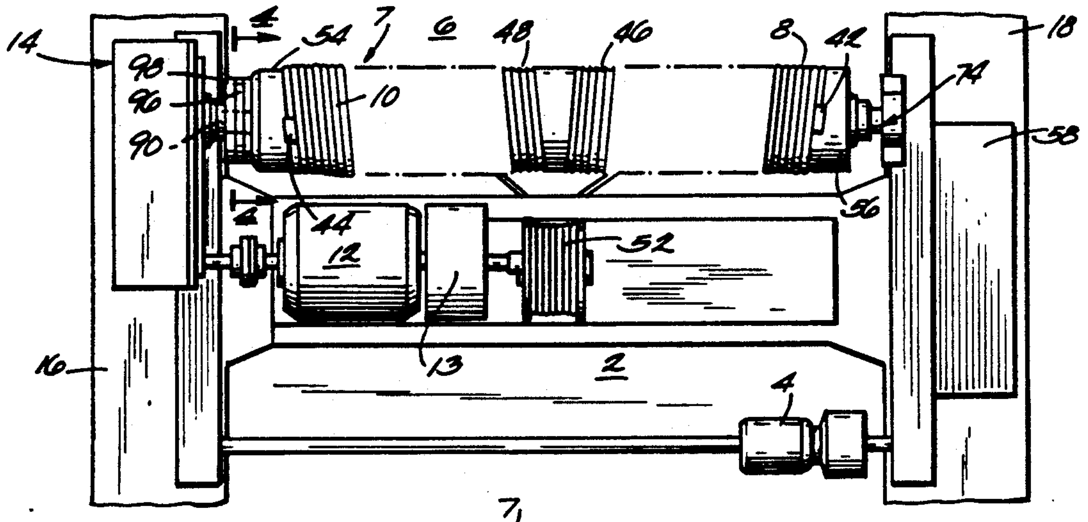
FIG. 2 is a top plan view, partially broken away, of the crane and hoist shown in FIG. 1.

Referring generally to FIGS. 1 and 2, an overhead crane is illustrated as having a pair of bridge beams 16 and 18 connected at their opposite ends to cross members 24 and 26, a trolley 2, and a hoist 6 mounted on the trolley. The members 24 and 26 are respectively supported on tracks 28 and 30 and the tracks 28 and 30 are in turn respectively mounted on supports 32 and 34. The crane is driven along the tracks 28 and 30 by drive motors 36 and 38 respectively mounted on the cross members 24 and 26.

The trolley 2 is supported on trolley tracks 20 and 22 which are respectively mounted on the crane bridge beams 16 and 18. The trolley 2 includes a trolley drive motor 4 for moving the trolley along the tracks 20 and 22.

The hoist 6 includes a rotatable drum 7, a drive gearbox 14 connected to the drum 7 by a drive shaft 90, and a drum drive motor 12, and a brake 13 connected to the gearbox 14. The drum 7, gearbox 14, motor 12 and brake 13 are all mounted on the trolley 2. A pair of ropes 8 and 10 are respectively connected to the drum at locations 42 and 44 and are windable about the drum in grooves 46 and 48. The ropes 8 and 10 extend from the drum 7 down to a bottom block 40 having a lower sheave assembly 50 and a load hook 60.

The ropes 8 and 10 extend around the lower sheave assembly 50, then up to and around an upper sheave assembly 52, then back down to and around the lower sheave assembly 50, and then up to the trolley 2 where the ropes are attached.

As shown in FIG. 1, a load 62 may be attached to the load hook 60 and carried by the block 40, ropes 8 and 10, and drum 7. The drum 7 is rotated in response to the drive of the gearbox 14 when the latter is driven by the motor 12. The drum 7 may be stopped or held stationary by application of the brake 13 to the drive motor 12. When the drum 7 is rotated in a first direction by the motor 12 and gearbox 14, the ropes 8 and 10 are wound off of the drum to lower the load 62. When the drum is rotated in an opposite second direction by the drive motor 12 and gearbox 14, the ropes 8 and 10 are wound on to the drum to raise the load 62. The movement of the trolley 4 along the bridge beams 16 and 18 and the stopping and rotation operation of the drum 7 is controlled by a control (not shown) in a control box 58.

Figure 3:
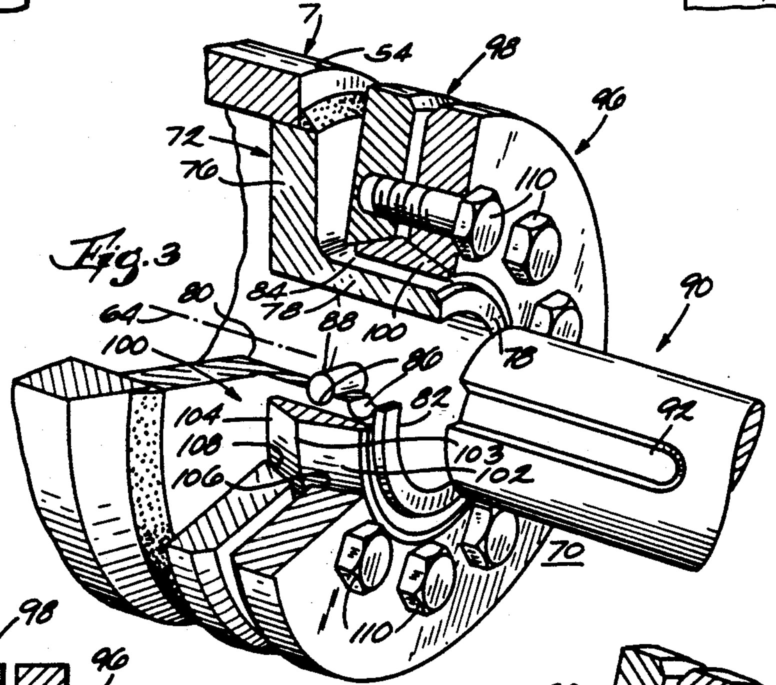
FIG. 3 is a perspective view, partially broken away, of the connector means according to the present invention.
Figure 4:
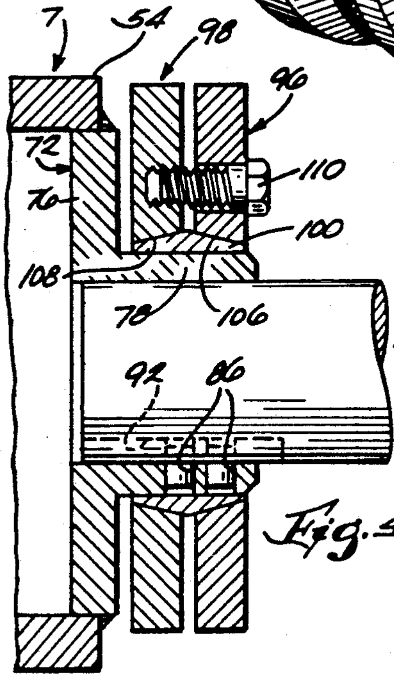
FIG. 4 is a cross-sectional view taken along lines 4—4 of FIG. 2.

With reference to FIGS. 2, 3 and 4, a connector 70 which provides the connection between the drum 7 and the drive gearbox 14 is illustrated. The drum 7 has opposite ends 54 and 56, as shown in FIG. 2, with a drum end 72 affixed to end 54 and a drum end 74 affixed to the end 56. The mode of affixation of the drum ends 72 and 74 to the drum 7 is by means of welding although other affixation means may also be used. As shown in FIG. 3, the drum end 72 includes a web portion 76 and a hub flange 78 extending axially outward from the web 76. The hub flange 78 has a hollow cylindrical wall 80 having an outer surface 84 and an opening 82 through the hub flange which is axially aligned with the axis of rotation 64 of the drum 7. The axis 64 is also the axis of the hub flange 78 and the drive shaft 90.

The drive shaft 90, which is part of the gearbox 14, fits in to the opening 82 and the opening 82 has a diameter such that the shaft 90 can be easily fitted into and removed from the hub flange 78 without stress on the gearbox 14. The shaft 90 has a slot or keyway 92 formed in its cylindrical surface 94 in an axial direction parallel to the axis 64 of the shaft 90, hub flange 78 and drum 7. The hub flange 78 has a pair of radially directed through openings 86 extending through the cylindrical wall 80. When the shaft 90 is inserted into the opening 82, the slot 92 is positioned opposite the through openings. Dowel pins 88 are inserted into the through openings 86 and extended into the slot 92. In order to eliminate stress on the drive shaft 90 and the gearbox 14, the dowel pins 88 have a diameter less than the width of the slot 92 and sufficiently less than the diameter of the through openings 86 so that the pins 88 are freely slidable in the openings 86 and preferably insertable manually by hand by a person assembling the hoist.

Figure 5:
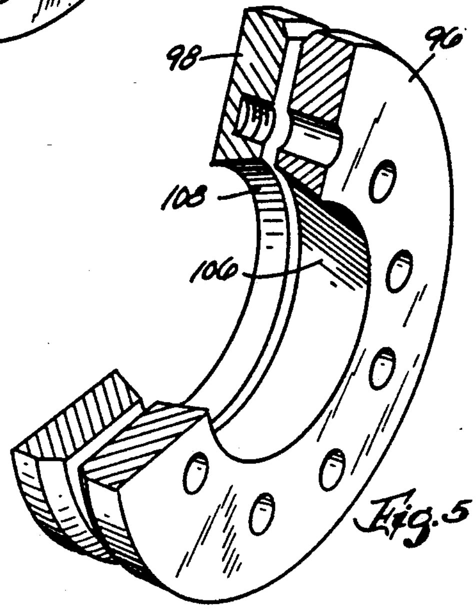
FIG. 5 is a perspective view, partially broken away, of the ring members of the connector means shown in FIG. 3.

After the shaft 90 is positioned in the opening 82 of the hub flange 78 and the pins 88 are positioned in the openings 86 and the slot 92, a pair of collars 96 and 98 and a shrink ring 100 are fitted over the hub flange 78 with the ring 100 in surrounding engagement with the outer surface 84 of the wall 80. The ring 100 has outer circumferential surfaces 102 and 104 each of which is inclined along its circumferential length in a radially outward direction toward a circumferential center line 103 of the ring 100. With reference to FIG. 5, the collar 96 has an inner circumferential surface 106 having an inclined shape corresponding to that of the surface 102 of the ring 100. The collar 98 also has an inner circumferential surface 108 having an inclined shape corresponding to that of surface 104 of ring 100. A plurality of locking screws 110 are arranged in a circumferential row and extend in an axial direction through the collar 96 and in a threaded manner into the collar 98. As shown in FIG. 3, when the ring 100 and the collars 96 and 98 are positioned on the hub flange 78, the inclined surface 106 of the collar 96 engages the inclined surface 102 of the ring 100 and the inclined surface 108 of the collar 98 engages the inclined surface 104 of the ring 100. With the locking screws 110 positioned in a direction relatively away from the collar 98 which is the position shown in FIG. 3, the ring 100 has a relatively large diameter so that it fits readily around the hub flange 78 and without application of any significant force on the hub. However, upon threading of the locking screws 110 toward the collar 96 to move the collars 96 and 98 toward each other, the inclined surfaces 106 and 108 of the collars move in a generally axial direction along the respective inclined surfaces 102 and 104 of the ring 100 toward the circumferential center line 103 of the ring 100 to compress the ring 100 in a radial direction. This position of the collars and ring is shown in FIG. 4. The compression of the ring causes it, in turn, to compress the cylindrical wall 80 of the hub flange 78 in a radial direction so that the hub flange tightly grips the drive shaft 90 and holds it within the hub opening 82. Also, the ring 100, in its position surrounding the hub wall 80, covers the radially outer ends 89 of the pins 88 to hold them in the openings 82 and in the slot 92 in the shaft 90 and prevent the pins from escaping from the openings in the slot. The pins 88 thereby prevent the drive shaft 90 from slipping and rotating relative to the hub flange 78 and drum 7 due to slippage of the hub on the shaft in the event of problems such as overloading of the hoist or loosening of the collars 96 and 98 against the ring 100.

It will be understood that the foregoing description of the present invention is for purposes of illustration and that the invention is susceptible to a number of modifications or changes none of which entail any departure from the spirit and scope of the present invention as defined in the hereto appended claims.

What is claimed is:

1. In a hoist having a drum including an axis, drive means for rotating the drum about the axis, rope means connected to and windable on to or off of the drum as the drum rotates, and load attachment means connected to the rope means for raising and lowering a load as the rope means is respectively wound on to and off of the drum, the combination comprising:

- a drum end affixed to the drum and including a hub flange extending in an axial direction from the drum and having a hollow cylindrical wall axially aligned with the axis of the drum;
- a drive shaft including an axis and extending from the drive means into the hollow cylindrical wall and having a slot disposed xially relative to the axis of the shaft; and connector means positioned on the hub flange for holding the shaft and hub flange together so that the drive means can rotate the drum, the connector means including at least one radial opening through the cylindrical wall of the hub flange perpendicularly to the axis of the shaft and a pin extending through the radial opening and into the slot in the drive shaft whereby the hub flange and drive shaft are prevented from rotating relative to each other during rotation of the drum by the drive means.

2. The combination according to claim 1 wherein the pin is freely slidable in radial directions relative to the opening and the slot.

3. The combination according to claim 1 wherein the connector means includes a cover member in engagement with the hub flange and overlying the radial opening in the hub flange and the pin whereby the pin is prevented from escaping from the radial opening and the slot.

4. The combination according to claim 3 wherein the cover member comprises a ring surrounding the hub flange.

5. The combination according to claim 4 wherein the slot has a width and the pin has a diameter less than the width of the slot.

6. The combination according to claim 1 wherein the connector means includes ring means in surrounding engagement with the hub flange for applying radial force to the hub flange and shaft together and for holding the pin in the radial opening in the hub flange and in the slot in the drive shaft.

7. The combination according to claim 6 wherein the pin is freely slidable in radial directions relative to the radial opening and the slot.

8. The combination according to claim 7 wherein the pin has a radially outer end in engagement with the ring means.

9. The combination according to claim 7 wherein the ring means covers the radial opening in the hub flange.

* * * * *